Oct. 2, 1945.　　　　M. M. BORDEN　　　　2,385,772
METERING APPARATUS
Filed July 17, 1942　　　　4 Sheets-Sheet 1
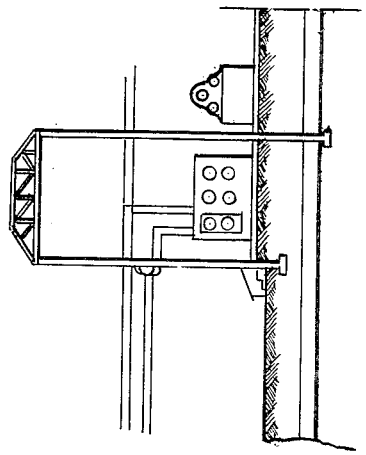
Fig. 1
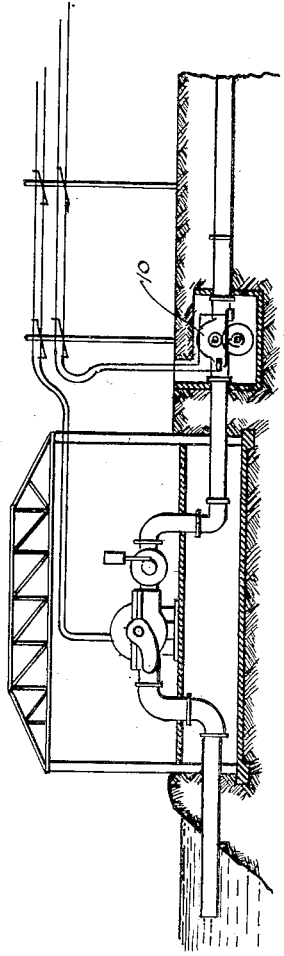
Fig. 2
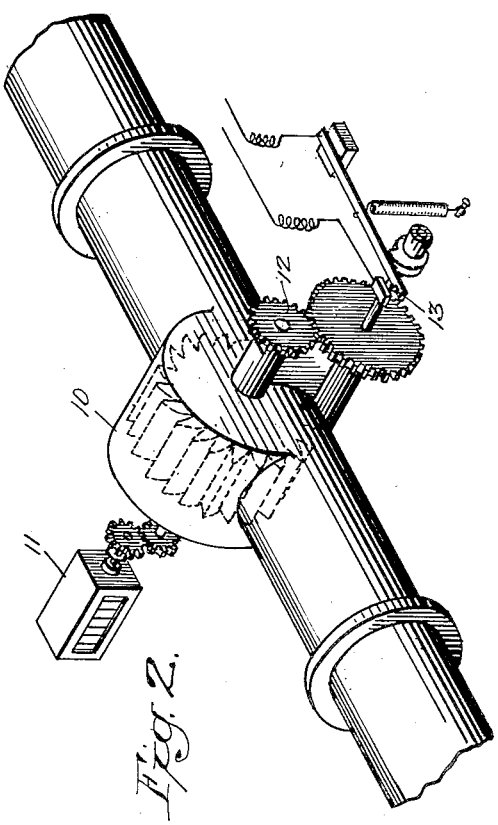
Inventor.
Moro M. Borden
By his Attorneys
Howson & Howson Oct. 2, 1945.  M. M. BORDEN  2,385,772
METERING APPARATUS
Filed July 17, 1942  4 Sheets-Sheet 4

Inventor
Moro M. Borden
By his Attorneys
Howson & Howson

Patented Oct. 2, 1945

2,385,772

UNITED STATES PATENT OFFICE 2,385,772

METERING APPARATUS

Moro M. Borden, Collingswood, N. J., assignor to Simplex Valve and Meter Company, Philadelphia, Pa., a corporation of Delaware Application July 17, 1942, Serial No. 451,367

10 Claims. (Cl. 73—194)

This invention relates to a combined registering and recording device and, more particularly, to a device of this character adapted to form a portion of a telemetering system.

An important object of this invention is to provide a telemetering system capable of producing at any reasonable distance from a measuring point angular or linear movements which shall be equal to or proportionately related to the rate of passage of unit quantities of materials or objects past such measuring point by means of impulses transmitted over a telemetering system.

An important object of the invention is to provide an apparatus of this character which will be free from characteristics affecting its operating accuracy by variation in external conditions such as voltage, current, or line resistances, and which may be operated at any selected distance from the source of measurement of the quantities to be recorded and registered.

Another object of the invention is to produce a device of this character in which the electrical elements may be made of the most elementary form in order that their varying characteristics may have no effect upon the accuracy of the telemetered results.

Another object of the invention is the production of a device of this character which may be made in such compact form that it may be readily enclosed and handled during shipment and in service as a unit.

Another object of the invention is to provide an extremely simple construction enabling low manufacturing costs and the provision of a unit of standard construction which will be suitable for all services with the possible exception of changes in timing gearing.

These and other objects I attain by the construction shown in the accompanying drawings wherein, for the purpose of illustration, I have shown a preferred embodiment of my invention and wherein:

Fig. 1 is a diagrammatic view illustrating a system constructed in accordance with my invention;

Fig. 2 is a diagrammatic perspective illustrating a volume-measuring device;

Figure 3:
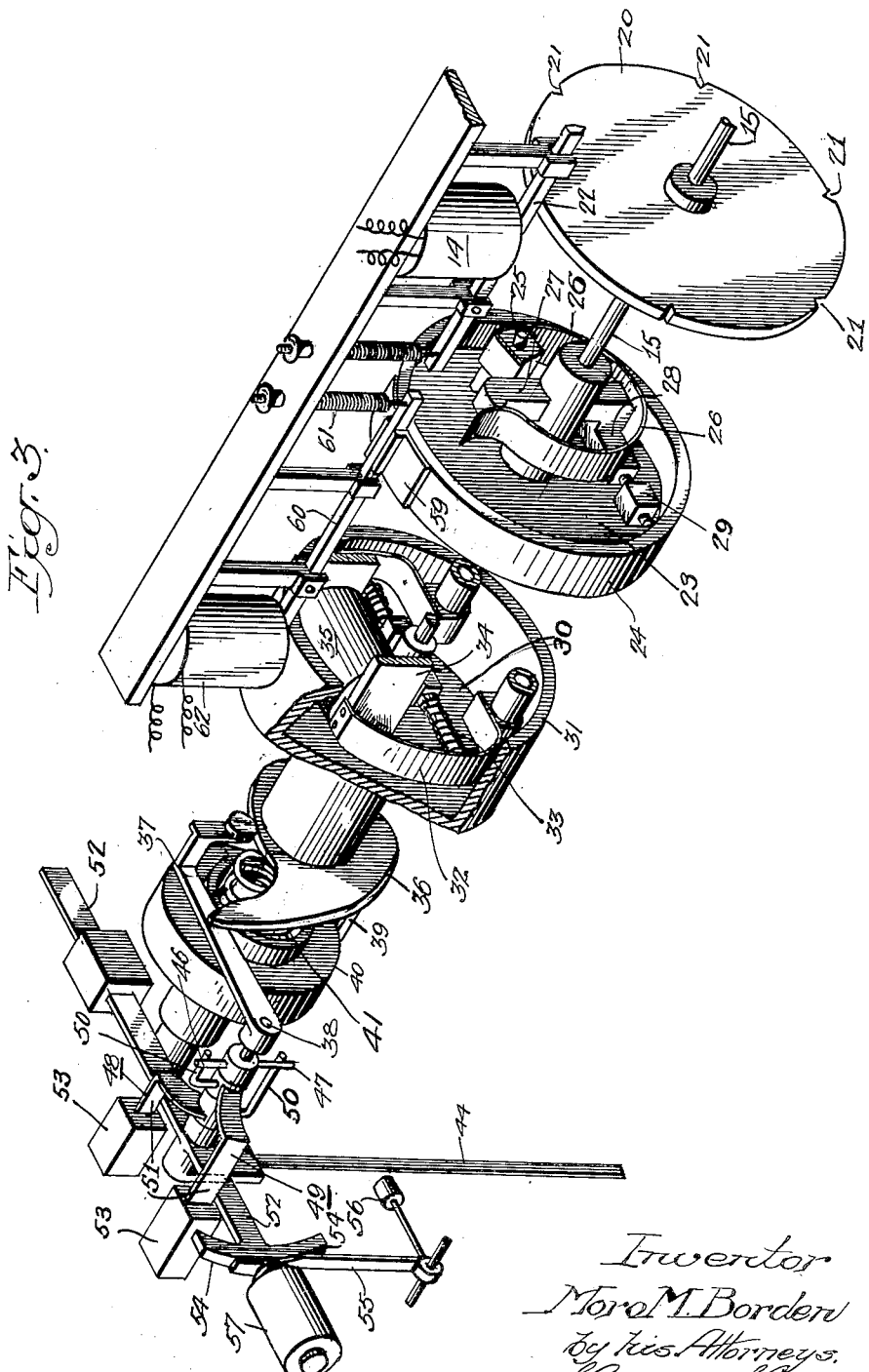
Fig. 3 is a fragmentary perspective of the recording and registering unit.
Figure 4:
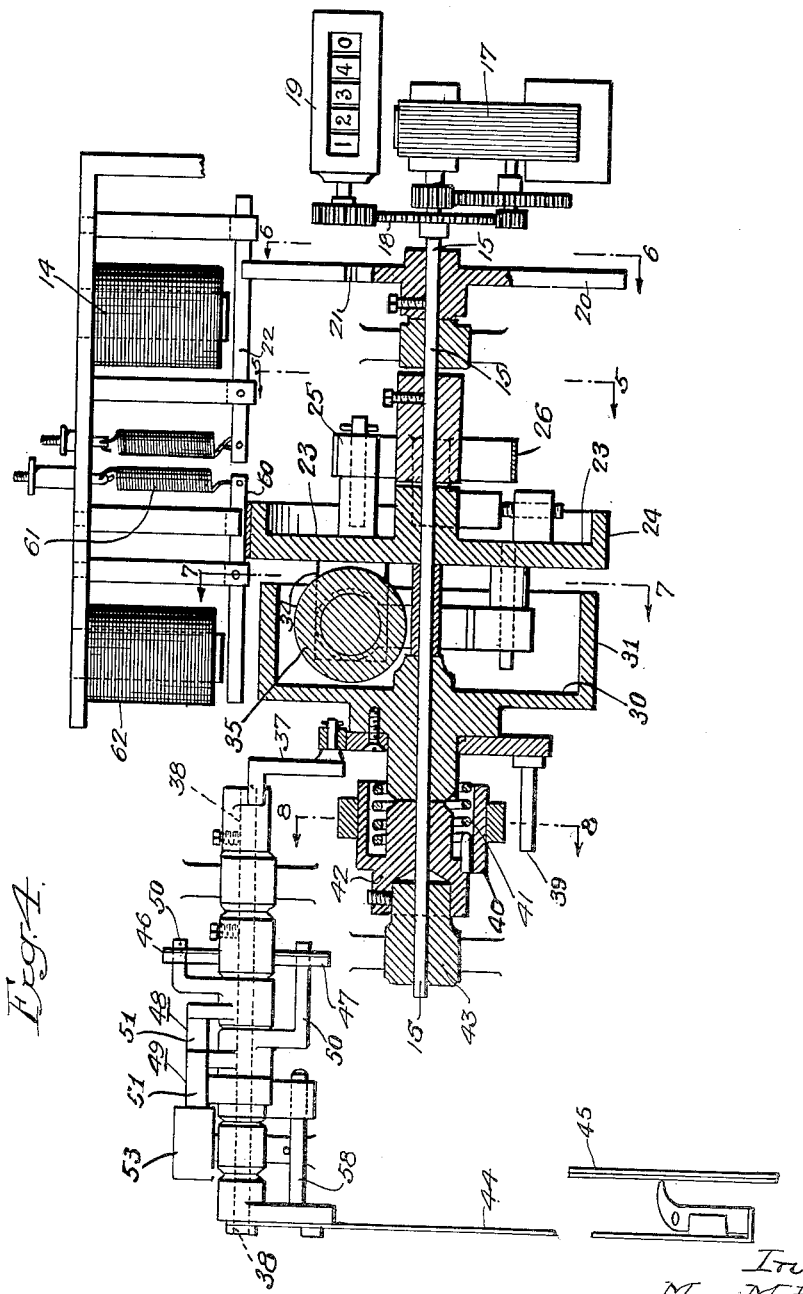
Fig. 4 is a longitudinal sectional view through the recording and registering unit.
Figure 5:
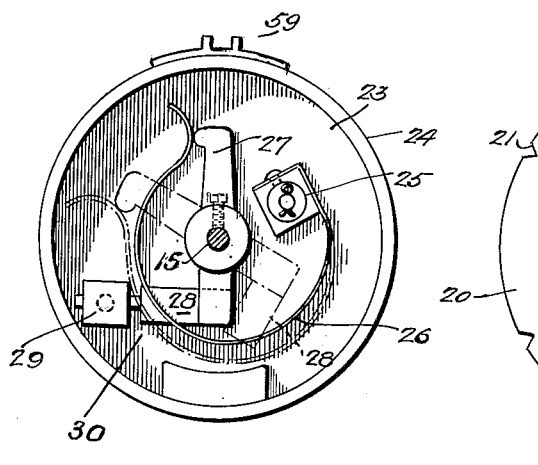
Fig. 5 is a section on line 5—5 of Fig. 4.
Figure 6:
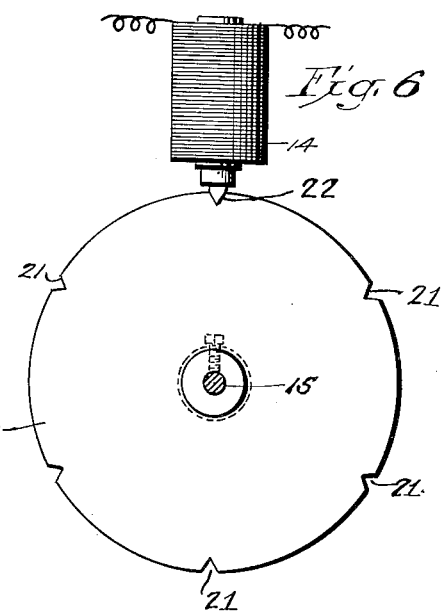
Fig. 6 is a section on line 6—6 of Fig. 4.
Figure 7:
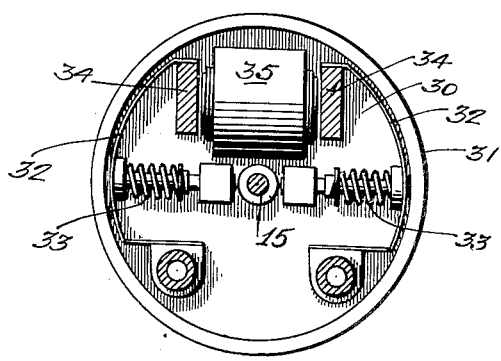
Fig. 7 is a section on line 7—7 of Fig. 4.
Figure 8:
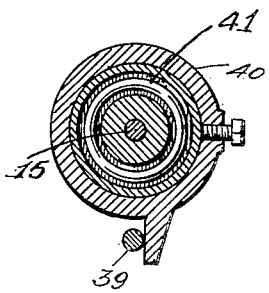
Fig. 8 is a section on line 8—8 of Fig. 4.
Figure 9:
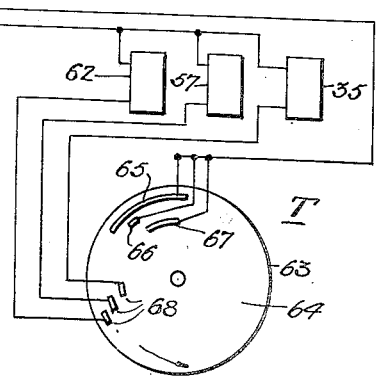
Fig. 9 is a diagrammatic view of the timer control.

Referring now more particularly to the drawings, the numeral 10 generally designates a volume-measuring device which may be of any suitable character. This device may, as in the usual construction, operate a mechanically associated counter 11 and, in accordance with my invention, likewise actuates, through suitable reduction gearing indicated at 12, a switch 13 periodically closing a circuit including an electromagnet 14 at the receiving unit, such closure occurring when a predetermined volume of material, such as a fluid, has passed through the measuring device 10.

The timing unit comprises a shaft 15 having a continual rotating impulse applied thereto through a small, constantly actuated motor 17. Shaft 15, through gearing 18, drives a counter 19, and this shaft has secured thereto a disc 20 the periphery of which has equidistantly spaced notches 21. These notches receive successively a spring-pressed holding bar 22, which bar forms the armature of electromagnet 14 and is disengaged from the notches at each periodic energization of this electromagnet. The duration of the impulse provided by the switch 13 is sufficiently short that the bar 22 is released before motor 17 can drive shaft 15 circumferentially a distance greater than the space between two adjacent notches so that after each energization of the electromagnet 14 motor 17 is free to drive shaft 15 for a short circumferential distance, following which the motion is checked by re-engagement of the latch bar 22 until a second impulse is received from switch 13.

Mounted upon the shaft 15 is a disc 23 having a peripheral rim 24. Secured to one face of the disc 23 through a stud 25 is a spring 26. The shaft 15 has secured thereto a member including an arm 27 engaging the free end of spring 26 and a second arm 28 which, by reason of the pressure of spring 26, normally engages against an adjustable stop 29 secured to the disc 23.

Likewise rotatably mounted on shaft 15 is a clutch element comprising a disc 30 having a flange 31 against the inner surface of which a pair of clutch springs 32 carried by disc 23 are normally engaged through coil springs 33. The terminal ends of clutch springs 32 comprise armatures 34 coacting with an electromagnet 35 likewise carried by disc 23 which electromagnet, when energized, releases the clutch springs freeing disc 30 for rotation with relation to disc 23. Secured to disc 30 is a cam 36 coacting with the terminal of an arm 37 secured to a shaft 38, the cam being so designed that the arm 37, and accordingly shaft 38, are oscillated through equal angles for equal rotative steps as applied to the shaft 15 from the disc 20. This cam has affixed thereto a pin 39 engaging a member 40 rotatable about shaft 15 and to which one end of a coil spring 41 is secured. The opposite end of this spring is secured to a stationary element 42 at present shown as affixed to a bearing 43 in which shaft 15 rotates. Spring 41 resists rotation of disc 30, and when this disc is released from the disc 23 will restore disc 30 and, accordingly, cam 36 to a predetermined zero position.

Shaft 38 constitutes a positioning device for a pen 44 coacting with a suitable chart 45, the operative connections between the shaft and pen being substantially identical with those shown in my prior Patent No. 2,159,882, issued May 23, 1939, for "Integrators." This mechanism includes a pair of pins 46 and 47 fixed to shaft 38 and at present shown as oppositely extending therefrom, and a pair of shifting arms 48 and 49 rotatable on shaft 38 and each having a lateral projection 50 arranged in the path of a pin 46 or 47 and a lateral projection 51 overlying a lever 52 oscillatable upon shaft 38. The engagement of the lateral projections 50 is with the same side of pins 46 and 47, that is to say, these projections engage the arms at the inner side of the included angle between the arms, with the result that upon rotation of shaft 38 in either direction the pin 46 or 47 will forcibly engage one of the lateral projections 50 while the other of these arms will recede from the lateral projection. Due, however, to the fact that the shifting arms 48 and 49 are counterweighted as at 53, the lateral projection of the arm from which the pin 46 or 47 is receding will tend to follow the pin, and in so doing will place its weight against the lever 52 in an attempt to rotate the same by and in accordance with the rotation of shaft 38.

Lever 52 is a balanced lever having one end thereof formed as a braking surface 54 against which a brake 55 is engaged as by means of a counterweight 56. An electromagnet 57 is employed to disengage brake 55 from the braking surface 54 at intervals, as hereinafter more fully set forth, and it will be obvious that when the lever 52 is released it will, by reason of the weight imposed thereon by one or the other of the shifting arms 48 or 49, move to a position corresponding to that of the arm 37, thus shifting pen 44 which is connected to lever 52 to rotate therewith as at 58.

The periphery of disc 23 has associated therewith a brake 59, which brake is carried by a lever 60 and is normally disengaged from the periphery of the disc through a spring 61. The lever 60 comprises the armature of an electromagnet 62 and each time the electromagnet is actuated the brake is applied to hold disc 23 against rotation.

The electromagnets 35, 57 and 62 are operated by timer T in the following sequence:

The timer includes a switch, generally designated at 63, this switch comprising a disc 64 rotated by any suitable clock mechanism or by a clock motor not herein shown. The disc 64 bears contacts 65, 66, and 67 coacting with brushes 68 to control the circuits of the electromagnets 35, 57 and 62. At the close of a predetermined interval, the electromagnet 62 is first energized to apply brake 59 to disc 23 and prevent rotation thereof. Electromagnet 57 is then energized to release the pen-positioning lever 52 for a sufficient interval to enable the lever to assume its new position, following which the circuit of the electromagnet 57 is opened and the lever 52 again clamped in position.

Electromagnet 35 is then energized to release the clutch springs 32 from disc 30, thus allowing spring 41 to return the cam 36 and arm 37 to their zero positions. The electromagnet 35 is then de-energized, allowing the spring clutches to re-engage with disc 30, following which the electromagnet 62 is de-energized to free the disc 23 for rotation.

In the operation of the apparatus, following the passage of a given quantity of the material measured through the volume-measuring member 10, an impulse is sent through the signalling circuit, temporarily energizing electromagnet 14 and freeing disc 20 for rotation. The disc is rotated through motor 17 through one step and this rotation is registered upon counter 19. A similar impulse is forwarded after the passage of each unit quantity and these impulses are imparted through spring 26 and the arm 27 to disc 23 and through the clutch elements 32 to disc 30 and thus to the cam 36. At the close of a selected time interval the disc 23 is locked against rotation and the pen-positioning lever 52 is freed to move to a position corresponding to that of the cam. Obviously, if this position is the same as that at the close of the preceding interval, there will be no movement of the lever, the pen arm remaining stationary. If, however, the quantity transmitted is greater or less than that during the preceding interval, the pen will assume a new position corresponding to such quantity. The disc 30 is then freed from disc 23 and is restored, together wtih cam 36, to its zero position by spring 41. Disc 23 is then freed for rotation and may begin a new quantity totalization. In event during that period when disc 23 is held against rotation the disc 20 is rotated by reason of the application of a quantitative impulse to electromagnet 14, the arm 27 will flex spring 26 and immediately upon release of disc 23 the spring will impart rotation thereto and to disc 30 and cam 36 so that even though an impulse be given shaft 15 during that period when the remainder of the mechanism is stationary, it will be stored and included in the succeeding totalization, as indicated by the position of the cam, and the average quantity recorded upon the chart will remain accurate.

While I have illustrated and described my apparatus as adapted to the measurement of unit liquid volume, it will be understood that unit quantities of other materials or things, such as solids or gases, may have their rate of passage for specified times measured by the same apparatus. The apparatus may obviously be readily adapted for measuring the passage of articles moving either at a slow or fast rate by simply equipping the drive of the element 64 with a variable speed transmission.

Since the construction illustrated is obviously capable of considerable variation without in any manner departing from the spirit of the invention, I do not wish to be understood as limiting myself thereto except as hereinafter claimed.

I claim:

1. In an apparatus for measuring the average rate of given occurrences, the combination of means for creating an impulse for each such occurrence, a movable member, means to move said member through a given distance for each impulse, a device having a zero position, an operative connection between the movable member and device whereby the latter is shifted from its zero position in accordance with the movement of the movable member during a given time interval, an indicating means, means to move said indicating means proportionately to the movement of said device, means for holding the indicating means against movement during movement of said device, means to periodically release said indicating means for repositioning in accordance with the position of said device, means to hold said device stationary during repositioning of the indicating means, means for thereafter returning said device to its zero position, and means included in said operative connection storing a movement of the member occurring during repositioning of the indicating means and during return of said device to its zero position and thereafter transmitting the same to said device.

2. In telemetering apparatus for measuring the average rate of passage of material by a given point at a location remote to said point, the combination of means at said point for creating an electrical impulse for the passage of each unit quantity of the material by said point, and apparatus at said location comprising a movable member, means to move said member through a given distance for each impulse, a device having a zero position, an operative connection between the movable member and device whereby the latter is shifted from its zero position in accordance with the movement of the movable member during a given time interval, an indicating means, means to move said indicating means proportionately to the movement of said device, means for holding the indicating means against movement during movement of said device, means to periodically release said indicating means for repositioning in accordance with the position of said device, means for holding said device stationary during repositioning of the indicating means and means for thereafter returning said device to its zero position.

3. In telemetering apparatus for measuring the average rate of given occurrences at a location remote to said point, the combination of means at said point for creating an electrical impulse for each such occurrence, and apparatus at said location comprising a movable member, means to move said member through a given distance for each impulse, a device having a zero position, an operative connection between the movable member and device whereby the latter is shifted from its zero position in accordance with the movement of the movable member during a given time interval, an indicating means, means to move said indicating means proportionately to the movement of said device, means for holding the indicating means against movement during movement of said device, means to periodically release said indicating means for repositioning in accordance with the position of said device, means for holding said device stationary during repositioning of the indicating means, means for thereafter returning said device to its zero position, and means storing a movement of the member occurring during repositioning of the indicating means and during return of said device to its zero position and thereafter transmitting the same to said device.

4. In apparatus for recording the rate of given occurrences, means to create an impulse upon each such occurrence, a movable recording device, means to hold said recording device against movement during a given part of each of equal time intervals and to release the same for movement during the remainder of such time intervals, a position determining member for the recording device having a zero position, means for storing energy in an amount corresponding to the displacement of said position determining member from its zero position and thereafter transmitting the same to said recording device, means to move the position determining member from its zero position a distance proportionate to the number of impulses transmitted by the first-named means during each such time interval, means operative at the close of each interval for operating said holding and releasing means for releasing the recording device for movement and resecuring the recording device, and then returning the position determining member to its zero position, and means storing an impulse created during the operation of the last-named means and imparting the same to said moving means at the beginning of the next time interval.

5. In apparatus for recording the rate of given occurrences, means to create an impulse upon each such occurrence, a movable recording device, means to hold said recording device against movement during a given part of each of equal time intervals and to release the same for movement during the remainder of such time intervals, position determining member for the recording device having a zero position, means for storing energy in an amount corresponding to the displacement of said position determining member from its zero position and thereafter transmitting the same to said recording device, means including a clutch to move the position determining member from its zero position a distance proportionate to the number of impulses transmitted by the first-named means during each such time intervals, a spring to return the position determining member to its zero position, means operative at the close of each interval for operating said holding and releasing means for releasing the recording device for movement, resecuring the recording device, and then releasing the clutch to permit return of the position determining member to its zero position, and means storing an impulse created during the operation of the last-named means and imparting the same to said moving means at the beginning of the next time interval.

6. In apparatus for recording the rate of passage of material past a given point, means to create an impulse upon passage of each unit quantity of the material past said point, a movable recording device, means to position the same including a single position determining member having a zero position, means biasing the position determining member to its zero position, a connection between said member and said recording device constantly tending to move the recording device to a position corresponding to that of the position determining member, means to hold said recording device against movement during a given part of each of equal time intervals and release the same for movement during the remainder of such time intervals, means to move the position determining member from its zero position a distance proportionate to the number of impulses transmitted by the first-named means during each such time interval, and means operative during such remainder of each interval for sequentially holding the position determining member against movement, releasing the recording device for movement, resecuring the recording device, and then returning the position determining member to its zero position.

7. In apparatus for recording the rate of given occurrences, means to create an impulse upon each such occurrence, a movable recording device, means to position the same including a single position determining member having a zero position, means biasing the position determining member to its zero position, a connection between said member and said recording device constantly tending to move the recording device to a position corresponding to that of the position determining member, means to hold said recording device against movement during a given part of each of equal time intervals and release the same for movement during the remainder of such time intervals, means to move the position determining member from its zero position a distance proportionate to the number of impulses transmitted by the first-named means during each such time interval, means operative during such remainder of each interval for sequentially holding the position determining member against movement, releasing the recording device for movement, resecuring the recording device, and then returning the position determining member to its zero position, and means storing an impulse created while the position determining member is stationary or is being returned to its zero position and imparting said impulse to the moving means at the beginning of the next time interval.

8. In apparatus for recording the rate of passage of material past a given point, means to create an impulse upon passage of each unit quantity of the material past said point, a movable recording device, means to position the same including a single position determining member having a zero position, means biasing the position determining member to its zero position, a connection between said member and said recording device constantly tending to move the recording device to a position corresponding to that of the position determining member, means to hold said recording device against movement during a given part of each of equal time intervals and release the same for movement during the remainder of such time intervals, means to move the position determining member from its zero position a distance proportionate to the number of impulses transmitted by the first-named means during each such time interval, comprising a rotatable member, means to rotate the rotatable member through a distance proportional to the number of impulses transmitted, a clutch, one element of which is connected to said position determining member, a yieldable connection between said rotatable member and the other element of the clutch, and means to sequentially hold the last-named clutch element against movement, for operating said holding and releasing means to release and secure the recording device, release and re-engage the clutch, and release the last-named clutch element.

9. In combination, a movable indicator, releasable holding means preventing movement of the indicator, position determining means for the indicator having a zero position, means biasing the position determining means to its zero position, a yieldable connection between the position determining means and the indicator tending to move the indicator to a position corresponding to that of the position determining means, means to move the position determining means from its zero position a distance corresponding to increments of a factor to be indicated, a clutch connecting the last named means and the position determining means, means operative at selected intervals to cyclically release and re-engage the holding means for the indicator and release and re-engage said clutch in the order named, and means included in the means to move the position determining means for storing increments of said factor accumulated during the operation of the cyclical means and imparting such increments to the position determining means upon re-engagement of said clutch.

10. In combination, a recorder having a movable indicator, releasable holding means preventing movement of the indicator, position determining means for the indicator having a zero position, means biasing the position determining means to its zero position, a yieldable connection between the position determining means and the indicator tending to move the indicator to a position corresponding to that of the position determining means, impulse responsive means producing increments of motion to move the position determining means from its zero position a distance corresponding to number of impulses received, a clutch connecting the last named means and the position determining means, means operative at selected intervals to cyclically release and re-engage the holding means for the indicator and release and re-engage said clutch in the order named, and means included in the impulse responsive means for storing increments of motion accumulated during the operation of the cyclical means and imparting such increments to the position determining means upon re-engagement of said clutch.

MORO M. BORDEN.